(12) United States Patent
Watanabe

(10) Patent No.: US 6,345,157 B1
(45) Date of Patent: Feb. 5, 2002

(54) CAMERA WITH BUILT-IN ELECTRIC CIRCUIT

(75) Inventor: Yoji Watanabe, Fuchu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/494,915

(22) Filed: Jan. 31, 2000

(30) Foreign Application Priority Data

Feb. 5, 1999 (JP) .......................................... 11-028862

(51) Int. Cl.⁷ ............................................... G03B 17/20
(52) U.S. Cl. ........................ 396/279; 396/296; 396/539
(58) Field of Search ................................ 396/279, 277, 396/539, 296, 287

(56) References Cited

U.S. PATENT DOCUMENTS

| | | | | |
|---|---|---|---|---|
| 5,081,483 A | * | 1/1992 | Ishimura et al. | ............ 396/279 |
| 5,732,295 A | * | 3/1998 | Seki et al. | ................... 396/279 |
| 6,167,203 A | * | 12/2000 | Ishimaru et al. | ............ 396/296 |

FOREIGN PATENT DOCUMENTS

| | | |
|---|---|---|
| JP | 7-64146 | 3/1995 |
| JP | 7-225408 | 8/1995 |
| JP | 9-211528 | 8/1997 |

* cited by examiner

Primary Examiner—W. B. Perkey
(74) Attorney, Agent, or Firm—Frishauf, Holtz, Goodman, Langer & Chick, P.C.

(57) ABSTRACT

In order to provide a camera capable of warning a user thereof that the camera is rendered inoperable because a predetermined battery is not set in a camera body or the battery is not put in the camera properly, in the camera according to the present invention, an electric circuit having a power source and a battery in detachable manner in a camera body is built in, a light-shield portion as means for optically shielding an optical path in a finder optical system for observing a subject image is driven to darken a view when the battery is removed or when the battery can not be used as a power source even if the battery is set, thereby warning the user that a trouble is generated in the power source.

15 Claims, 4 Drawing Sheets

WHEN BATTERY
IS PUT IN

WHEN BATTERY
IS REMOVED

※ THIS FLOWCHART IS EFFECTIVE ONLY WHEN BATTERY IS PUT IN.

CAMERA WITH BUILT-IN ELECTRIC CIRCUIT

BACKGROUND OF THE INVENTION

The present invention relates to a finder of a camera, and more particularly, to a finder capable of checking whether a battery is put in a camera or whether the battery is properly put in the camera.

In recent years, many cameras include built-in batteries as power sources. However, in the case of a camera of this kind, if a capacity of the battery is lowered and the specified voltage can not be supplied, there is a possibility that the camera is suddenly rendered inoperable. Thereupon, in order to prevent such an accident from being generated, there are provided many cameras having function for detecting and warning that the amount of remaining battery capacity (i.e., remaining capacity) is lowered before the camera is rendered inoperable, i.e., a so-called "battery check function".

In order to warn of this battery shortage, it is necessary that an appropriate battery is properly set in the camera and the battery capacity remains in such an amount that at least a battery check circuit and a warning circuit can be operated. However, even when there exists the remaining capacity of the battery, if the battery is not set, or the battery is not set in the camera properly (e.g., a poor connection, reversed polarities +/−), a necessary power is not supplied and therefore, the camera can not even warn of the battery shortage.

However, in such a case, there is a tendency that a user of the camera who does not know a structure of the camera in detail misunderstands that the camera itself is out of order. Further, in the case of a conventional warning system which relies on a battery check circuit, a warning circuit and the like which do not work until the power is supplied, if the power supplying source is only the battery, the camera serves no purpose in a state where the battery can not be used and therefore, another system is required.

It is an object of the present invention to provide a camera capable of warning a user thereof that the camera is rendered inoperable because a predetermined battery is not set in a camera body or the battery is not put in the camera properly.

BRIEF SUMMARY OF THE INVENTION

According to a first invention, there is provided a camera comprising: a finder for observing an image of a subject, a power source battery detachably set in a camera body, and display means for displaying, in a finder, that the power source battery is removed from the camera body.

According to a second invention, there is provided a camera comprising: a finder for observing an image of a subject, a power source battery detachably set in a camera body, and observation preventing means for mechanically bringing the finder into observation inoperable state in association with the removing operation of the power source battery.

According to a third invention, there is provided a camera comprising: a finder for observing an image of a subject, a power source battery detachably set in a camera body, and observation preventing means provided in the optical path of this finder for electrically bringing the finder into non-transparent state when the power source battery is removed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B show images appearing in the finder, wherein FIG. 3A is an explanatory view showing a finder image immediately before the battery is put in the camera, and FIG. 3B is an explanatory view showing a finder image immediately after the battery is put in the camera;

FIGS. 4A and 4B show a detecting mechanism of a second embodiment of the invention, wherein FIG. 4A is a block diagram of the detecting mechanism which is applied to a single-lens reflex camera, and FIG. 4B shows an outer appearance of the single-lens reflex camera;

DETAILED DESCRIPTION OF THE INVENTION

The present invention will be explained in detail by means of a plurality of embodiments below.

Figure 1:
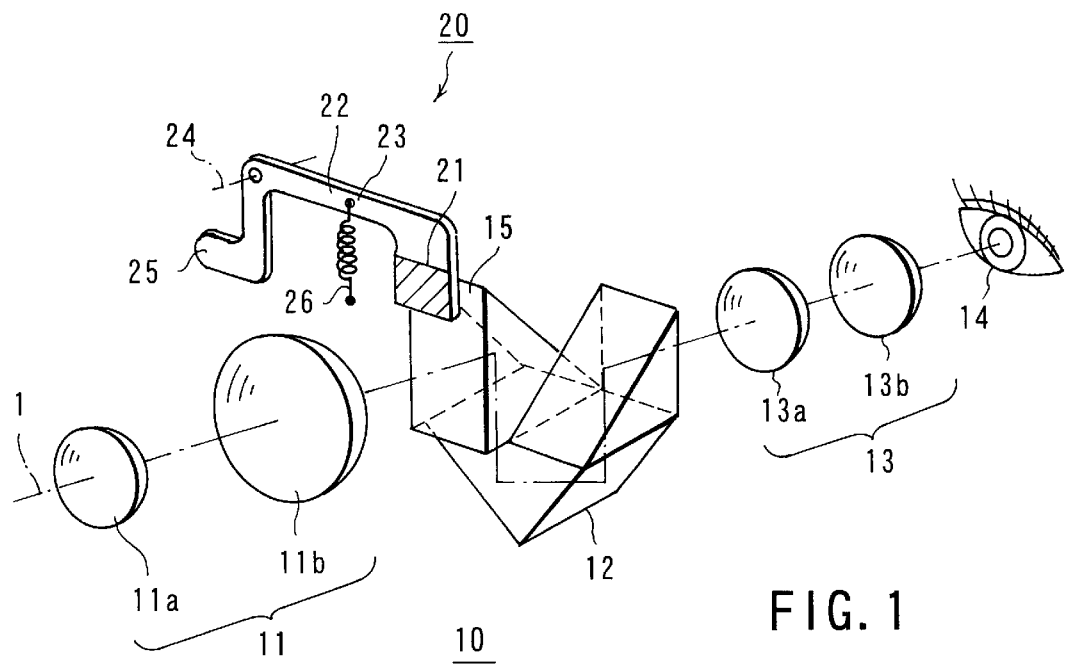
FIG. 1 is a schematic view showing a structure of a real image type finder used in a lens-shutter camera and the like according to a first embodiment of the present invention.

FIG. 1 is a schematic view showing a structure of a "real image type finder" used in a lens-shutter camera and the like according to a first embodiment of the present invention. This is a detecting mechanism 20 provided in a finder optical system 10 which mechanically detects whether a battery is set or removed and inserts a light-shield plate in the finder.

Lenses 11a and 11b constituting an objective lens group 11 and a Porro prism 12 are arranged on a finder optical axis, and a portion of the detecting mechanism 20 which detects that a battery (not shown) exists in a battery chamber is interposed between the Porro prism 12 and the lens 11b. As illustrated, lenses 13a and 13b constituting an eyepiece group 13 are arranged behind the Porro prism 12. The finder optical system 10 is structured such that an image of a subject is formed as an inverted real image on an image-forming surface 15 of the Porro prism 12 by the objective lens group 11, and the image is formed into an erect image by the Porro prism 12, and the image reaches an eye 14 of the user through the eyepiece group 13.

As a system realizing the object of the present invention, the real image type finder of the above structure has the detecting mechanism 20 which inserts a semi-transparent light-shield portion 21 in front of the image-forming surface 15 (on the side of the objective lens 11) when the battery (not shown) is not put in the camera, and draws back the light-shield plate 21 when the battery is put in the camera.

Figure 3A:
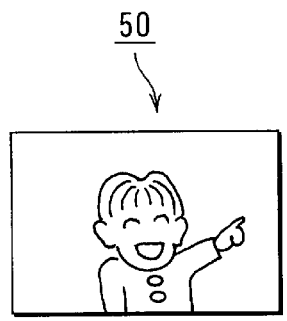
Figure 3B:
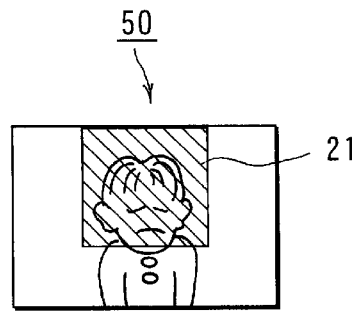

More specifically, in FIG. 1, a semi-transparent light-shield portion of the above-described light-shield portion 21 is integrally formed with an interlocking lever 22. This interlocking lever 22 is rotatably and pivotally supported about a lever rotation shaft 24 in the vertical direction. In a state where the battery (not shown) is not put in the camera body as shown in the drawing, the interlocking lever 22 is biased by a resilient spring 26 such as a helical spring such as to insert the light-shield portion 21 in the vicinity of a front portion of the image-forming surface 15. That is, in this state, the light-shield portion 21 prevents a portion of finder pencils of light from entering the eye 14 of the user. An image appearing in the finder at that time is formed such that a portion of an upper portion of a screen is semi-transparent state as shown in FIG. 3B.

Figure 2:
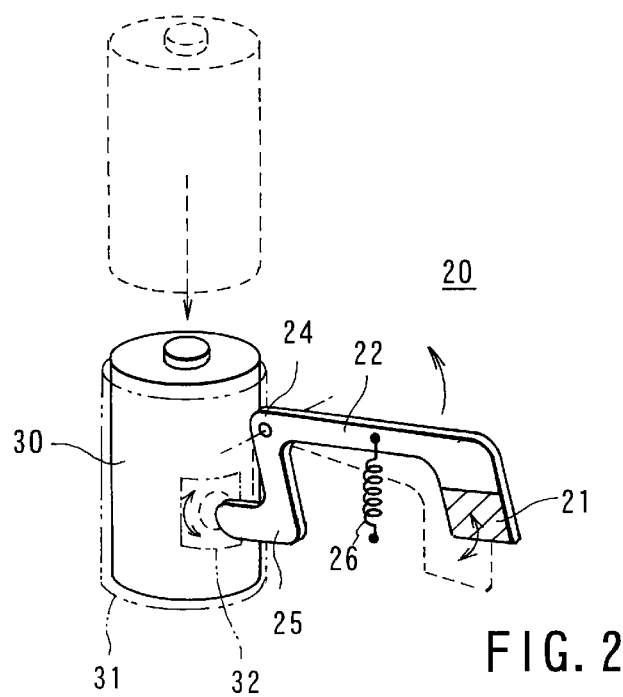
FIG. 2 is a perspective view showing an operation of a detecting mechanism of the first embodiment when a battery is put in the camera.

FIG. 2 shows an operation of the detecting mechanism 20 of the first embodiment when a battery 30 is put in the camera. FIGS. 3A and 3B show finder images immediately before and after the battery is put in the camera, respectively. When batteries are to be changed, if the battery 30 shown with broken lines is inserted in a battery chamber 31 shown with a chain line of the camera body from above and set as shown with solid lines, a battery detecting portion 25 of the interlocking lever 22 which has been inserted in the battery chamber is pushed downward from an opening 32 formed in the battery chamber 31 by a side surface of the battery 30 and is retreated from the battery chamber 31. Therefore, the interlocking lever 22 is rotated in a counterclockwise direction shown with an arrow against the biasing force of the spring 26. As a result, the light-shield portion 21 which has been inserted in front of the image-forming surface 15 is retreated from an image-forming range and therefore, a finder image is brought into a normal state where the image is visible over the entire surface as shown in FIG. 3A so that it is possible to normally take a picture.

In this manner, according to the first embodiment, when the battery 30 is not put in the camera, the camera can not be operated normally and thus, the finder image is partially allowed to be darkened so that the user can notice that the battery 30 is not set. This system can be said to be a mechanical "battery non-set" detecting and informing mechanism in place of the conventional warning means which is not operated if a power source for display or voice is not provided. The object of the present invention can be realized by this simple mechanism.

(Modification 1)

In this example, the light-shield portion 21 employs a semi-transparent plate comprising material different from the interlocking lever 22, but the light-shield portion 21 need not be semi-transparent and may be formed of the same material as one end of the interlocking lever 22. Of course, the light-shielding effect is perfectly exhibited by this structure, and it is impossible to see through only this portion. With this example, also, the same effect can be obtained. Further, the entire finder rather than a portion thereof may be light-shielded.

Figure 4A:
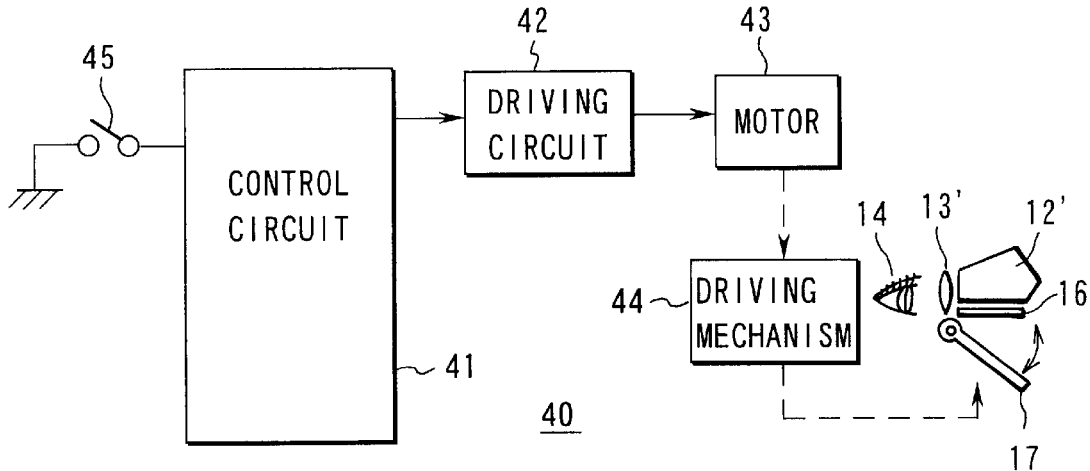

Next, FIG. 4 shows a structure of a detecting mechanism 40 applied to a single-lens reflex camera as a second embodiment of the present invention. This example is based on an idea that a finder view is shielded in response to the opening operation of a battery chamber lid which is carried out before the battery is taken out rather than when the battery is taken out. However, in this example, it is unnecessary to provide a special mechanism of the structure of the first embodiment.

Figure 4B:
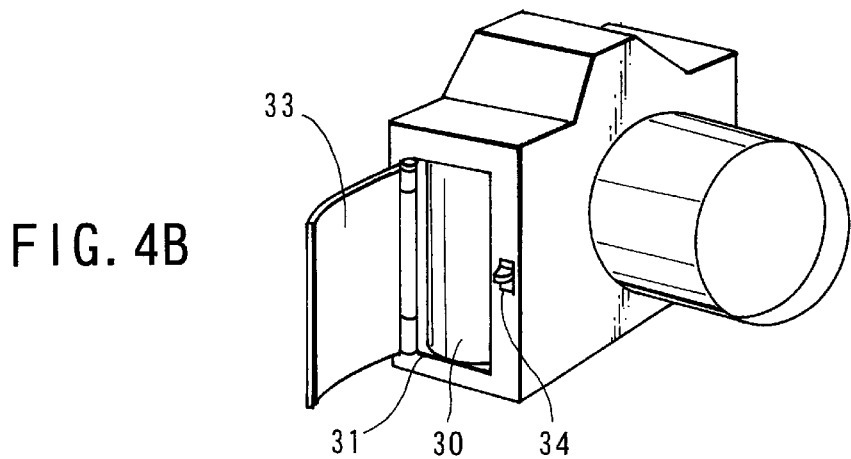

FIG. 4B shows an outer appearance of the single-lens reflex camera. When the battery chamber lid 33 provided on a side surface of the camera body is opened, the battery chamber 31 is exposed, and the battery 30 is set therein. Opening/closing state of the battery chamber lid 33 is detected by a detecting member 34.

The detecting mechanism 40 has a driving mechanism 44 which can turn up (mirror up) a movable mirror 17 of the single-lens reflex camera. In order to control the mirror up of the movable mirror 17, a battery chamber lid open-state detecting SW 45 which moves in association with the detecting member 34 is provided on the battery chamber lid as a switch which is operated in association with the opening movement of the lid. There is provided a control circuit 41 which recognizes the open state of the lid by the state of the SW 45, and drives a motor 43 through a driving circuit 42 to control the driving mechanism 44.

Under normal conditions, an image of a subject is reflected by the movable mirror 17 to form a laterally inverted image on a focusing screen 16. The image appearing on the focusing screen 16 reaches the eye 14 of the user as an erect image through a pentaprism 12' and an eyepiece 13'.

An up/down movement of the movable mirror 17 is controlled by the control circuit 41, and if the control circuit 41 sends a predetermined driving control signal to the driving circuit 42, the driving circuit 42 supplies an appropriate driving current to the motor 43 based on the signal, and the driving force of the motor 43 moves the movable mirror 17 up or down through the driving mechanism 44.

In the single-lens reflex camera of the above structure, in order to achieve the object of the present invention, it can be found that in this example, if the battery chamber lid open-state detecting SW 45 which is connected to the control circuit 41 to detect the opening state of the battery chamber lid (not shown) of the camera body recognizes that the battery chamber lid is displaced to the opened state, the movable mirror 17 of the single-lens reflex camera is moved up to disappear (light-shield) the finder image from the view and thereafter, when the battery is taken out, the light-shield state is maintained, thereby informing the user of the fact that the battery is not set.

Figure 5:
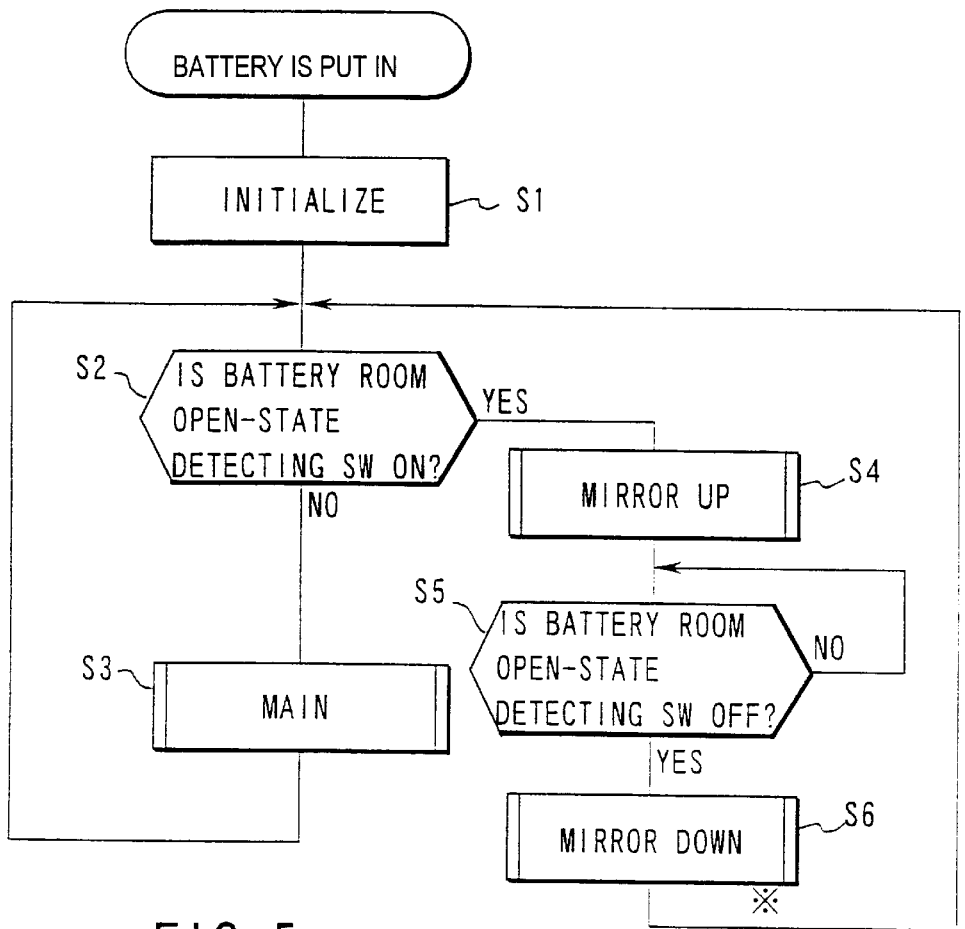
FIG. 5 is a flowchart showing an operation by a program incorporated in a control circuit of the single-lens reflex camera.

The operation based on a program incorporated in the control circuit 41 of the single-lens reflex camera will be explained in detail with reference to an operation flowchart shown in FIG. 5. When the battery is set in the camera and the power source is supplied, the control circuit 41 runs the following "battery putting" routine.

That is, in step S1 first, initialize processing is carried out as initialization. For example, the driving mechanism of the camera, the I/O port of the control circuit and the like are initialized (S1).

In step S2, a state of the battery chamber lid open-state detecting SW 45 is checked (S2). If the battery chamber lid open-state detecting SW 45 is in ON state, this means that the battery chamber is opened and thus, the flow proceeds to step S4. On the other hand, if the result of the above check is not ON state, the flow proceeds to step S3 where a "main" sub-routine is executed (S3) and then, the flow proceeds back to step S2. This sub-routine is a control routine for normal operation of the camera such as the taking of pictures, and since details thereof are known technique, detailed explanation is omitted here.

If it is judged that the battery chamber lid open-state detecting SW 45 is ON in step S2, the flow proceeds to step S4 to execute a "mirror up" sub-routine (S4). This sub-routine includes processing steps for supplying a control signal to the driving circuit 21 for bringing the movable mirror 17 shown in FIG. 4 into its up state. When the movable mirror 17 is turned up, the pencils of light of the subject are not guided to the finder optical system and therefore, the finder image is darkened and disappears.

The flow proceeds to step S5 in this state, and waits until the battery chamber lid open-state detecting SW 45 is turned OFF (S5). If the battery chamber lid is closed and the battery chamber lid open-state detecting SW 45 is turned OFF, a "mirror down" sub-routine is executed (S6) in step S6 only when the battery has available voltage, and after the movable mirror 17 is turned down, and the flow proceeds back to step S2 to repeat the same processing steps.

The above operation procedures can be summarized as follows. In this single-lens reflex camera, if the user opens the battery chamber lid, the movable mirror 17 is turned up based on the simultaneous change of the battery chamber lid open-state detecting SW 45 and as a result, the finder image disappears, and the view in the finder becomes dark. Thereafter, if the user takes out the battery, the camera is rendered electrically inoperable in a state where the movable mirror is kept turning up. In this state, even if the battery chamber lid is closed, since the battery is not set, the movable mirror 17 should not be turned down and the finder view should not be obtained. Therefore, if the user takes a look at the finder, he or she can find that the battery is not set in the battery chamber from the dark state of the view.

As described above, it can be found that the second embodiment employs a system in which the finder optical system 10 is brought out of observable state in association with the taking-out operation of the battery 30 for example and thus, the movable mirror 17 which serves as observation preventing means is brought into its up state, thereby warning the user.

Therefore, according to this detection control system based on the program control by the control circuit 41, it is unnecessary to especially provide the camera with a new mechanical mechanism. Further, the object of the present invention can be achieved by appropriate control using further software.

(Modification 2)

The above-described processing steps of the program can easily be changed. Especially, as the limiting condition until the mirror down is executed in step S6, a judging step for judging whether the voltage of the battery is equal to or greater than a predetermined voltage may be provided for example. Further, inspection may be performed previously to judge whether the set battery is new or old. Here, a system may be employed which informs the user by darkening the finder view including a case where the battery is too old to be used. It is preferable to inform, in detail, the user of the fact that the battery is old by another easy method.

Figure 6:
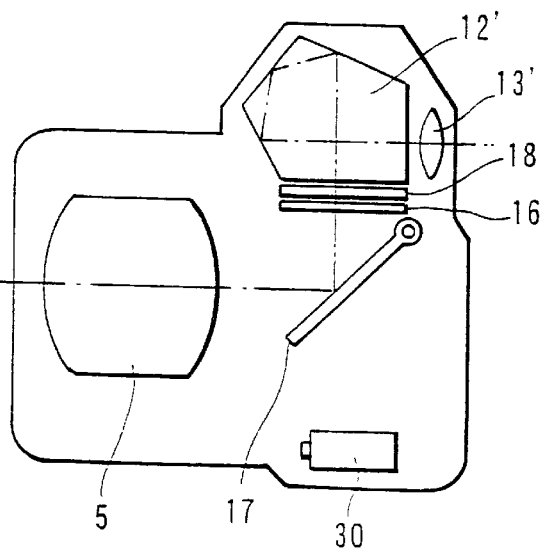
FIG. 6 is a view showing a structure of a detecting mechanism of a third embodiment of the invention applied to the single-lens reflex camera.

FIG. 6 is a view showing a structure of a detecting mechanism of a third embodiment of the invention applied to the single-lens reflex camera. This is one example in which an optical shutter device 18, for example, which becomes non-transparent by power shutdown is disposed in the finder optical path through which the subject is observed. That is, in order to automatically bring the finder into the light-shield state when the power supply to the electric circuit of the camera is interrupted, the optical shutter device 18 having characteristics that the element becomes non-transparent when the power supply is interrupted is adjacently provided between the focusing screen 16 and the pentaprism 12'.

The subject image passes through a photographing optical system 5 and then reflected by the movable mirror 17 which is turned down, thereby forming the image on the focusing screen 16. If the power is supplied from the battery 30, the optical shutter device 18 is in the transparent state. Therefore, the user can observe the subject image formed on the focusing screen 16 through the optical shutter device 18, the pentaprism 12' and the eyepiece 13'.

The optical shutter device 18 disposed between the focusing screen 16 and the pentaprism 12' is an element having characteristics that the device 18 is physically in the light-shield state (semi-transparent state, light dispersion state may also be permissible) in a normal state, and becomes transparent state when the power is supplied from the battery 30 through a predetermined driver circuit (not shown). Therefore, the device 18 is automatically brought into the light-shield state when the battery is not properly set or appropriate power is not supplied, and the user can recognize from the change of the device 18 that there is generated a trouble, for example, that the battery is not set, the battery has connection failure, or the direction of the battery is not correct.

There are various optical devices called "optical shutter device", and examples thereof are a PLZT optical shutter capable of controlling its transmittance and index of refraction by magnitude or direction of electric field, "a polymer network liquid crystal display (PN-LCD)" which is changed from the dispersion state to the transparent state when voltage is applied, and the like.

In the third embodiment, a finder apparatus using the polymer network liquid crystal display will be explained. The "polymer network liquid crystal display" mentioned here is a device in which polymer material and liquid crystal are dispersed, and a layer in which a nematic liquid crystal having positive dielectric anisotropy is dispersed in the transparent polymer material having substantially the same index of refraction as that with respect to ordinary ray of the liquid crystal is sandwiched by transparent substrates provides at its inner surfaces with transparent electrodes. The polymer network liquid crystal display is brought into the dispersion state when voltage is not applied, and is brought into the transparent state when voltage is applied.

If the device is brought into the dispersion state in the finder, the subject image becomes obscure, and the device is not brought into complete light-shield state, but into semi-transparent, i.e., slightly dark state. Therefore, the device is in such a state when the user takes a look at the finder, he or she can recognize the power source of the camera is in a trouble that battery is removed, the battery becomes exhausted and can not be used, the battery is not properly set and the like.

Figure 7:
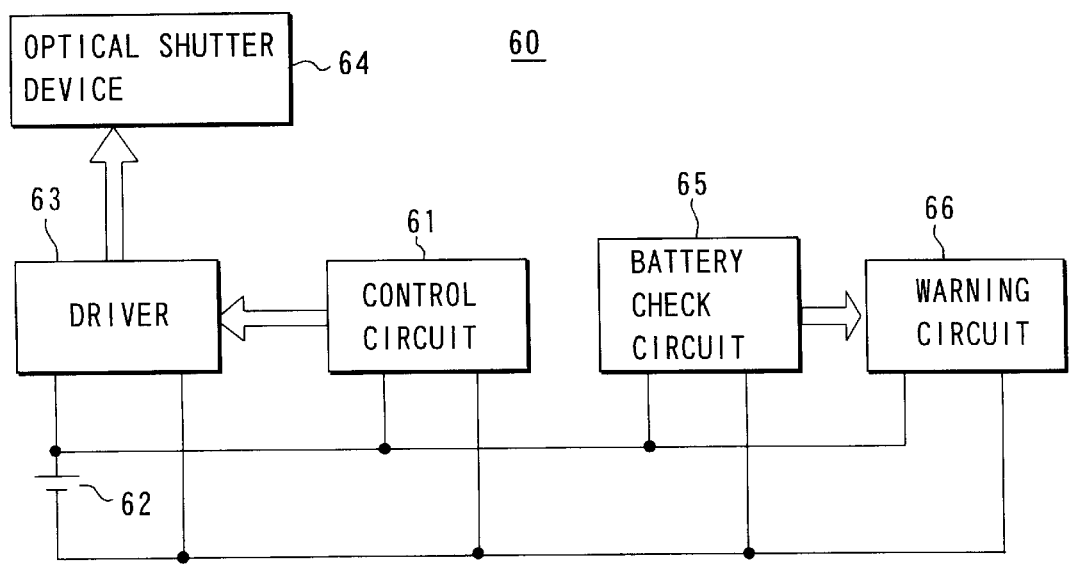
FIG. 7 is a block diagram showing a circuit structure in the third embodiment.

FIG. 7 is a block diagram showing a structure of a circuit 60 in the third embodiment. That is, a control circuit 61 of this circuit 60 is connected such that the control circuit 61 controls to drive a driver 63 for driving the above-described optical shutter device 62 (shown with 18 in FIG. 6). Further, the control circuit 61 is connected to a warning circuit 66 as one of warning items such that an operation signal from a battery check circuit 65 can be obtained. All of the circuit constituent elements (61, 63, 65 and 66) are connected such that necessary electric power is supplied to each of the elements from the battery 62. The device employed as the optical shutter device 64 is polymer network liquid crystal display.

In the camera of the third embodiment structure as described above, the control of the optical shutter device 64 through the driver 63 constituting the detecting mechanism 60 is processed as one error process based on the control circuit 61 which collectively controls the operation of the entire camera. That is, the optical shutter device 64 of the polymer network liquid crystal display disposed in the finder optical path of the camera is operated through the driver 63 based on the control circuit 61, and maintains its transparent state as long as the driving voltage is applied from the driver 63. However, if the battery 62 is removed from the camera body intentionally or accidentally, the driver 63 can not apply the driving voltage to the optical shutter device 64. Therefore, the optical shutter device 64 in the finder is changed into the non-transparent state (i.e., dispersion state).

This optical shutter device 64 is driven by the driver 63 when the control signal from the control circuit 61 is received, but the finder is brought into the semi-transparent state not only by removing the battery 30 as the power source, and the finder can be brought into non-transparent state also by a predetermined control signal from the control circuit 61. Therefore, it is possible to make full use of the finder, for example the finder can be brought into non-transparent state when the camera can not take picture.

When the battery 62 is set, the remaining capacity of the battery 62 is checked by the battery check circuit 65. If it is detected that the remaining capacity of the battery 62 is lowered to an extend that the camera can not operate normally, for example, the exposure can not be controlled although the optical shutter device 64 can be maintained in the transparent state, the operation signal is sent to the warning circuit 66.

In order to inform the user of this abnormal state, the warning circuit 66 warn visually or aurally. More specifically, when the remaining capacity of the battery 62 is in such a voltage level that the camera can not operate normally but the warning circuit 66 and the optical shutter device 64 can be driven, the warning circuit 66 warns, but when the remaining capacity of the battery 64 is lowered to such an extent that even the optical shutter device 64 can not be driven, the finder view is brought into non-transparent state, thereby warning the user.

As described above, it can be found that the third embodiment employs a system in which the optical shutter device is used as observation preventing means for bringing the finder into electrically non-transparent state. This one sheet of optical shutter device 64 mounted in the finder optical path is brought into non-transparent state in replay to the interruption of the power supply from the battery 62, thereby informing the user that the abnormal state is generated by darkening the finder view. With this structure, the object of the present invention can be achieved.

(Modification 3)

In addition to the above, when a trouble related to the power source is generated such as a trouble in which the battery is removed from the battery chamber of the camera, the trouble may be informed more concretely instead of bringing the finder view into non-transparent state entirely. For this purpose, if a certain region of the finder view is made clear, and if a predetermined character or symbol (e.g., "battery x", "no battery" or the like) is displayed on the clear portion so that the user can recognize, the user can confirm a trouble related to the power source more concretely.

Figure 8:
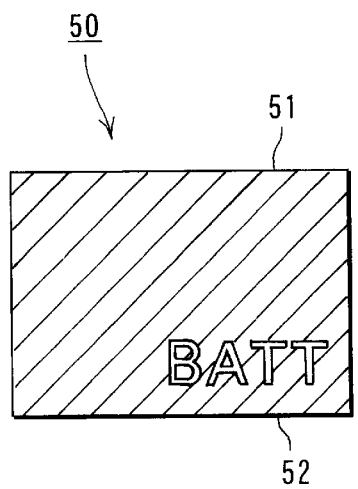
FIG. 8 is an explanatory view showing a state of a view of a finder image of this single-lens reflex camera.

FIG. 8 shows a state of a view of a finder image as one example. That is, the entire view 50 is dark, and a warning message "BATT" meaning that battery (power source battery) is in trouble is displayed in a relieved in white manner on a right and lower portion of the view. With this structure, the user can recognize that the power source is in trouble. This is one example of the display message, and the abnormal state may be suggested by darkening the finder view using another kind of device, and a concrete portion, e.g., the battery chamber of the power source may be displayed by an image using another display message.

Although the optical shutter device is disposed in the vicinity of the image-forming surface in the third embodiment, the device may not necessarily be disposed in the vicinity of the image-forming surface if the pencils of light of the subject image is disposed to bring the finder into non-transparent state, and the optical shutter device may be mounted to an arbitrary place in the finer optical path.

(Other modification)

Although each of the second and third embodiments shows a case in which the present invention is applied to a single-lens reflex camera, the present invention can also be applied to a twin-lens reflex camera in which photographing optical path and finder optical path are separated, while appropriately changing based on a camera structure of this kind.

Further, various modifications can be made without departing the subject matter of the present invention.

As described above, according to the present invention, it is possible to provide a camera capable of warning a user thereof that a predetermined battery is not put in the camera body or the battery is not set properly and the camera is rendered inoperable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera with a built-in electric circuit comprising:
   a battery chamber for accommodating a power source battery capable of being put in a camera body;
   a finder for observing an image of a subject; and
   display means for displaying that the camera is in an inoperable state in the finder when the power source battery is not put in the battery chamber or when electric power can not be supplied to the electric circuit from the power source battery.

2. The camera with a built-in electric circuit according to claim 1, wherein
   the camera includes detecting means for detecting that the power source battery is not put in the battery chamber, and
   the display means indicates that the battery is not put in the battery chamber based on a detection result of the detecting means.

3. A camera with a built-in electric circuit comprising:
   a battery chamber for accommodating a power source battery capable of being put in a camera body;
   a finder for observing an image of a subject; and
   a detecting mechanism for detecting whether the power source battery exists in the battery chamber, and when the detecting mechanism detects that the power source battery does not exist in the battery chamber, the detecting mechanism optically shields at least a portion of a visual range of the finder.

4. The camera with a built-in electric circuit according to claim 3, wherein the detecting mechanism includes a detecting member for mechanically detecting that the power source battery is put in the battery chamber, and a light-shield member for entering the visual range of the finder in association with the detecting member.

5. The camera with a built-in electric circuit according to claim 4, wherein the detecting mechanism enters the battery chamber when the power source battery is not put in the battery chamber, and retreats when the power source battery is put in the battery chamber.

6. A camera with a built-in electric circuit comprising:

a battery chamber for accommodating a power source battery capable of being put in a camera body;

a finder for observing an image of a subject; and observation preventing means for bringing the finder into an observation inoperable state in association with an operation for removing the power source battery from the battery chamber.

7. The camera with a built-in electric circuit according to claim 6, wherein a putting opening for the power source battery is provided with a battery chamber lid which can be opened and closed, and the observation preventing means brings the finder into the observation inoperable state when the battery chamber lid is changed from a closed state to an opened state.

8. The camera with a built-in electric circuit according to claim 7, wherein the observation preventing means maintains the observation inoperable state when the electric power is not supplied from the power source battery even if the battery chamber lid is changed from the opened state to the closed state.

9. The camera with a built-in electric circuit according to claim 6, wherein a putting opening for the power source battery is provided with a battery chamber lid which can be opened and closed, and with a detecting switch for detecting an opened state and a closed state of the battery chamber lid, and the observation preventing means brings the finder into the observation inoperable state when the battery chamber lid is changed from the closed state to the opened state by the detecting switch.

10. A camera with a built-in electric circuit comprising:

a battery chamber for accommodating a power source battery capable of being put in a camera body;

a finder for observing an image of a subject; and observation preventing means which is provided in an optical path of the finder and brought into a non transparent state when the power source battery is removed from the battery chamber.

11. The camera with a built-in electric circuit according to claim 10, wherein the observation preventing means is brought into a transparent state when electric power is supplied from the power source battery, and is brought into the non transparent state when the supply of the electric power is interrupted.

12. The camera with a built-in electric circuit according to claim 11, wherein the observation preventing means is an optical shutter device whose transparent characteristics are changed depending upon presence or absence of the supply of the electric power.

13. The camera with a built-in electric circuit according to claim 12, wherein the optical shutter device is a polymer network liquid crystal display (PN-LCD).

14. A camera with a built-in electric circuit comprising:

a battery chamber for accommodating a power source battery capable of being put in a camera body;

a finder for observing an image of a subject; and an optical device provided in an optical path of the finder, wherein the optical device is changed from a transparent state to a non-transparent state when a supply of electric power from the power source battery is interrupted.

15. The camera with a built-in electric circuit according to claim 14, wherein the optical device disperses observation subject light when the supply of electric power from the power source battery is interrupted.

* * * * *